United States Patent Office 3,451,768
Patented June 24, 1969

3,451,768
PREPARATION OF DELTA FORM CRYSTALLINE
TITANIUM TRICHLORIDE
Luciano Luciani and Gianfranco Corsi, Ferrara, Italy, assignors to Montecatini Edison S.p.A., Milan, Italy, a corporation of Italy
No Drawing. Filed June 11, 1965, Ser. No. 463,359
Int. Cl. C01g 23/02
U.S. Cl. 23—87
5 Claims

ABSTRACT OF THE DISCLOSURE

Highly active delta form crystalline $TiCl_3$ composition produced by reduction of titanium tetrachloride with aluminum metal in the stoichiometric ratio of 3 mols of $TiCl_4$ per gram-atom of aluminum metal, in the absence of any diluent, the reduction process being carried out in a ball mill, using balls having a selected diameter in the range of from 14 to 27 mm., the operating conditions of the ball mill being selected so that the value of the ratio $$(K_s+K_t) \cdot \frac{K_s}{K_t} \cdot \frac{D}{d} \cdot n^2$$

wherein $K_s$ is the ratio between the weight of the balls in kg. and the volume of the ball mill in liters; $K_t$ is the ratio between the weight of $TiCl_4$ in kg. and the volume of the mill in liters; $D$ is the diameter of the ball mill in centimeters; $d$ is the diameter of the balls in centimeters; and $n$ is the speed of rotation of the mill in r.p.m.; is between $2.5 \times 10^6$ and $8.5 \times 10^6$, and at a temperature of from 100° C. to 250° C. up to a conversion higher than 85%, the process being completed at a temperature lower than 100° C.

---

This invention relates to an improved method for the preparation of catalysts used in the low pressure polymerization of alpha-olefins. More particularly it relates to an improved method of preparing crystalline, highly active titanium trichloride by the reduction of titanium tetrachloride with metallic aluminum under controlled conditions.

It is known that titanium trichloride is one of the most useful components of catalysts for the low pressure polymerization of ethylene and higher alpha-olefines. For this purpose, it is used mostly in combination with organometallic compounds of metals of Groups II and III of the Periodic Table according to Mendeleyeev. Especially effective catalysts are obtained by mixing titanium trichloride with an aluminum-dialkyl-monohalide, e.g., diethylaluminum-monochloride. This catalyst system, when used for the polymerization of propylene, polymerizes said monomer stereoregularly to high yields of polypropylene consisting at least prevailingly of isotactic macromolecules non-extractable with boiling n-heptane.

Violet, crystalline titanium trichloride can be obtained in various ways by reduction of titanium tetrachloride. The reduction can be carried out, for example, by means of hydrogen at a temperature higher than 650° C., by means of metal alkyls at low temperature, or by means of reducing metals at intermediate temperatures. A particularly well known and conventional method involves the reduction of $TiCl_4$ with aluminum metal, preferably in powder form.

This particular method for the reduction of titanium tetrachloride has been fully described in the art. The working temperature reported for the reduction varies from 20 to 300° C. and higher and normally the reduction takes place in presence of an excess of a liquid phase consisting of an excess of liquid titanium tetrachloride or of a hydrocarbon diluent, usually an aromatic hydrocarbon.

In some cases, a small quantity of aluminum trichloride is added, to eliminate the induction period. The reduction product is in all cases a crystalline, violet composition in which the Al:Ti:Cl ratio is substantially 1:3:12.

Many improvements in this method for the preparation of a crystalline titanium trichloride composition by the reduction of titanium tetrachloride with aluminum have also been described.

For instance, it has been proposed to wet- or dry-grind the reduction product, preferably in a ball mill, to increase its catalytic activity.

However, the above methods involve many disadvantages in practice. When a hydrocarbon diluent is employed, it must be distilled off from the final product. A titanium tetrachloride excess which is often used to facilitate agitation and insure against the presence of any free aluminum in the final reduction product, requires an analogous distillation, preferably under vacuum, to drive off the last residues. Carrying out the reduction in the absence of any diluent or titanium tetrachloride excess, i.e., with a stoichiometric ratio of 1 gram-atom of aluminum to 3 moles of titanium tetrachloride, would have the advantage of eliminating the necessity for distilling off any volatile substance at the end of the reduction. However, such a procedure has not been regarded as feasible since, according to the prior disclosures, it is practically impossible to bring the reduction to completion under those conditions. In fact, after most of the titanium tetrachloride has been reacted, the reaction mixture rapidly forms a hard cake, which hinders the agitation and further mixing of the reagents. This occurs, also, when the reduction is carried out in a conventional ball-mill and therefore, a diluent is added at this point to fluidize the mixture and the mixing is then continued.

It has now been found that the above disadvantages can be eliminated and a crystalline violet $TiCl_3$ composition substantially free from aluminum metal can be obtained by an improved method of effecting the reduction of titanium tetrachloride with aluminum in an stoichiometric ratio of 3 to 1 and in absence of any diluent, by performing the reduction step in a conventional ball-mill under strictly controlled conditions.

It has been found that this reduction can be brought practically to completion, without the formation of a hard cake, when the reduction itself is carried out in a ball-mill the balls of which have a diameter comprised within the critical range of from 14 to 27 mm., and when the value of a particular function of the diameter of the balls, the diameter of the mill, the charging rate of the balls and of the reagent materials, and of the speed of rotation of the mill are also in a critical range. According to usual practice, the mill diameter should not be less than 8–10 times the ball diameter; however an upper limit is not given.

An object of the present invention is, therefore, to provide an improved method for the preparation of a crystalline, violet $TiCl_3$ composition in which the $TiCl_3$ is in substantially the delta form by reduction of titanium tetrachloride with aluminum metal in the stoichiometric ratio of 3 mols of $TiCl_4$ per gram-atom of the aluminum metal in the absence of any diluent, and optionally in the presence of catalysts such as $AlCl_3$, HCL or alkyl halides, in a ball mill, characterized in that the process is carried out by using balls having a selected diameter in the range from 14 to 27 mm, and with operating conditions of the ball mill selected so that the value of the ratio $$(K_s+K_t) \cdot \frac{K_s}{K_t} \cdot \frac{D}{d} \cdot n^2$$

wherein $K_s$ is the ratio between the weight of the balls in kg and the volume of the ball mill in liters; $K_t$ is the ratio between the weight of TiCl₄ in kg. and the volume of the mill in liters; D is the diameter of the ball mill in centimeters, d is the diameter of the balls in centimeters and n is the speed of rotation of the mill in r.p.m., is comprised between $2.5 \times 10^6$ and $8.5 \times 10^6$, and that the reduction is carried out at a temperature of 100–250° C. up to a conversion higher than 85% and is completed at a temperature lower than 100° C., preferably at room temperature.

The ball mill, in which the reduction reaction is carried out, preferably consists of a material resistant to corrosion by TiCl₄. Mills made, e.g., of steel or special steels are used. The balls may be made of analogous materials.

It has been noted that by operating in a ball mill under the aforementioned critical conditions, the reduction of TiCl₄ can be carried out to practical completion without hindering the continuous contact between liquid TiCl₄ and aluminum metal since effective agitation of the mass by the balls is not hindered.

Under these conditions, there is obtained, as final product, a crystalline violet composition in which the TiCl₃ is present in the crystalline delta-form, namely the form which, as known, has the highest activity in the low pressure polymerization of alpha-olefins and, in the case of the higher alpha-olefins, also the highest stereospecificity.

By operating according to the prior art, even under the best conditions, only a portion of the TiCl₃ was in the delta-form, and the final composition comprised varying amounts of crystalline alpha- or gamma-TiCl₃ having lower activity and, in the case of the higher alpha-olefins, relatively lower stereospecificity.

A further advantage of the process of the present invention is that the crystalline violet composition, in which all of the TiCl₃ is present in the crystalline delta-form, is obtained in from 8 to 22 hours, a time interval which is markedly lower than is required using prior art conditions.

The following examples are given to illustrate the invention, and are not intended to be limiting.

Example I 580 g. of titanium tetrachloride (3.05 mols), 27.5 g. of aluminum metal (1.02 mols) and 12 g. of aluminum trichloride (TiCl₄/Al molar ratio=3:1) are introduced into a 9 l. steel ball mill having a diameter of 20 cm. and provided with stainless steel balls having a diameter of 16 mm.

The mill is then immersed into an oil bath at 175° C. and rotation is started with a rate of 75 r.p.m., so that the value of the ratio $$(K_s + K_t) \cdot \frac{K_s}{K_t} \cdot \frac{D}{d} \cdot n^2$$

is $4.37 \times 10^6$.

After 5 hours of reaction under the aforementioned operating conditions the temperature of the oil bath is lowered to about 25° C. and the rotation of the mill is carried on at the same speed for 16 hours.

The mill is then removed from the bath and the TiCl₃ obtained is discharged by using a suitable sieve system in order to separate the balls.

595 g. of product are withdrawn. The product is a very divided and free-flowing violet solid which by analysis shows the following composition:

| | | |
|---|---|---|
| TiCl₃ | percent | 72.2 |
| AlCl₃ | do | 26.4 |
| TiCl₄ | do | 0.8 |
| Metal aluminum | p.p.m. | <10 |

The X-rays spectrum (CuKα radiations) shows that the TiCl₃ consists completely of the highly active delta-form, characterized by the following interplanar distances:

| | A. |
|---|---|
| Very strong | 5.85 |
| Medium | 2.93 |
| Weak | 2.70 |
| Very strong | 1.74 |
| Very weak | 1.69 |
| Weak | 1.47 |
| Very weak | 1.13 |
| Very weak | 1.015 |

A sample of the product discharged from the mill, treated at 250° C. for 4 hours under a high vacuum (residual pressure 0.5 mm. Hg) shows an AlCl₃ loss of 15.1 g per 100 g of sample corresponding to 57.5% of the starting AlCl₃.

A second portion of the product discharged from the mill is treated with a 10% n-heptane solution of aluminum triethyl at 40° C. for 4 hours while agitating. The analysis of the total aluminum before and after the treatment shows that 42% of the initial AlCl₃ content of the sample is removed.

A propylene polymerization run is then carried out in a 5 l. autoclave provided with a paddle agitator by charging propylene under a constant pressure of 3 absolute atm. 2 g. of the composition obtained above, 6.2 g. of aluminum diethyl monochloride and 2 l. of n-heptane as the solvent. The polymerization is carried out for 5 hours at a temperature of 65° C.

The polymeric suspension thus obtained is discharged and stripped with steam until the solvent is completely eliminated. After drying in an oven at 80° C. under vacuum for 16 hours, 650 g. of polypropylene are obtained. The polymer, when subjected to hot n-heptane extraction for 24 hours, shows an isotactic fraction content of 94%. The yield is therefore: 65 g./g. TiCl₃ composition/h.

Example 2

Ethylene is homopolymerized in the same autoclave and under analogous operating conditions, thus obtaining a highly crystalline polyethylene in high yields.

Example 3

Propylene is polymerized as in Example 1 for a period of 2 hours. The unreacted propylene is then eliminated from the autoclave, and the latter is blown out (nitrogen) to a residual pressure of 0.6 abs. atm. Ethylene is then introduced into the autoclave in an amount equal to 5% by weight calculated on the reatcted propylene, and the polymerization is continued until the ethylene is exhausted. 225 g. of a propylene/ethylene heteroblock copolymer were obtained.

Example 4

12 kg. of TiCl₄ (63.2 mols) and 575 g. of aluminum powder (21.3 gram-atom) with a Ti/Al ratio=3:1 are charged into a 200 l. steel mill provided with steel balls having a diameter of 22 mm.

Rotation is started at a speed of 39 r.p.m. while heating the mill by oil circulation in the jacket at 170° C. and fixing the other parameters so as to obtain the value $2.64 \times 10^6$ for the critical ratio (as given in Example 1).

After 4 hours the mill is cooled to 25° C. while continuing the rotation for 18 hours and keeping the other operating conditions constant.

At the end of the 4 hours, 12.5 kg. of a free-flowing violet powder are discharged. The analysis shows that the product has the following composition:

| | | |
|---|---|---|
| TiCl₃ | percent | 74.5 |
| AlCl₃ | do | 23.5 |
| TiCl₄ | do | 1.0 |
| Aluminum metal | p.p.m. | <1.0 |

The X-ray spectrum shows that all TiCl₃ is in the particularly active delta form.

A portion of the product of the mill subjected to thermal decomposition at 250° C. under vacuum for 4 hours showed an AlCl₃ loss of 11.7 g. per 100 g. of composition, corresponding to 50% of the starting AlCl₃ content.

The treatment with a 10% n-heptane solution of aluminum triethyl as described in Example 1 solubilized 45% of the AlCl₃ content of the sample.

A polymerization run carried out under the conditions of Example 1 gave 600 of dry polypropylene having a residue after heptane extraction of 93%.

Example 5

120 kg. of TiCl₄, 5.75 kg. of aluminum powder (Ti/Al molar ratio=3:1) and 2.0 kg. of AlCl₃ are charged in a 3 cm. industrial steel mill havin a diameter of 130 cm. and provided with the heating device of the mill of Example 2 and with balls having a diameter of 25 cm.

Rotation at the speed of 30 r.p.m. is started while keeping the temperature at 150 and fixing the other parameters so that the critical ratio of the mill (as given in Example 1) has the value of $2.84 \times 10^6$.

After 7 hours the mill is cooled to 25° C. while continuing the rotation for an additional 14 hours.

120 kg. of a free-flowing violet TiCl₃ powder are then discharged.

The analysis shows that the product has the following composition:

TiCl₃ ----------------------------------percent-- 73
AlCl₃ ----------------------------------do---- 24.6
TiCl₄ ----------------------------------do---- 1.8
Aluminum metal ---------------------p.p.m-- 170

The X-ray spectrum shows that the product is a TiCl₃ in the highly active delta form.

The treatment of 250° C. for 4 hours under high vacuum led to the elimination of 14 g. of AlCl₃ per 100 g. of sample, corresponding to 57.5% of the starting AlCl₃.

The treatment with aluminum triethyl according to the modalities of Example 1, solubilized 49% of the AlCl₃ content of the product treated.

The polymerization of propylene, carried out as in Example 1, gave 620 g. of polypropylene having a residue after heptane extraction of 94.5%.

For comparison purposes there were carried out several runs (A to D, inclusive, below) in which TiCl₄ was reduced by means of aluminum metal under conditions different from those of the present process, and the composition obtained was used for the polymerization of propylene.

Run A.—TiCl₄ and Al in the stoichiometric ratio of 3:1 were introduced into a 5.8 l. ball mill having a diameter of 22.5 cm. provided with steel balls having a diameter of 16 mm.

Rotation at the speed of 64 r.p.m. was started at the temperature of 190° C.

The filling degree was selected so as to obtain a value of the critical ratio (given in Example 1) of $1.06 \times 10^6$.

After 3 hours the temperature was lowered to 40° C. and the rotation was carried on at the same speed for an additional 15 hours.

At the end of the 3 hours, there were discharged 400 g. of a crystalline composition which in the polymerization of propylene under the conditions specified in Example 1 gave only 260 g. of polymer, the lower catalytic activity being due to the fact that the value of the critical ratio was below the lowest limit according to the present invention.

Run B.—A test analogous to that of Run A was carried out in the same mill by regulating the filling degree of TiCl₄+aluminum metal so as to obtain a value of $2.3 \times 10^6$ for the critical ratio.

At the end of the total 18 hours, there were discharged 950 g. of composition on the basis of TiCl₃. The polypylene polymerization run according to Example 1 gave 420 g. of polymer, namely an amount which, also in this case, is remarkably lower than that obtained with the catalytic composition of Example 1.

Run C.—Steel balls having a diameter of 10 mm. were charged in the ball mill of Run A. The rotation speed was kept at 64 r.p.m. The other conditions were fixed so as to have a value of $5.4 \times 10^6$ for the critical ratio.

406 g. of TiCl₃ composition were discharged. This composition when used in the polymerization of propylene under the conditions of Example 1, gave 400 g. of polymer. This value shows the importance of the diameter of the balls used in the ball mill for the preparation of the crystalline composition on the basis of TiCl₃ on the activity of the final product even if the value of the ratio (as given in Example 1) is within the critical range.

Run D.—Steel balls having diameter of 16 mm. and TiCl₄ plus aluminum metal in the stoichiometric ratio of 3:1 were charged into a 9 l. ball mill having the diameter of 20 cm., the value of the critical ratio being $4.3 \times 10^6$, for a rotation speed of 70 r.p.m.

The temperature was kept at 150° C. for the whole reaction time (22 hours).

650 g. of TiCl₃ composition were discharged, the activity of which, in the polymerization of propylene according to Example 1, was very low.

It is evident from a comparison of the examples illustrating the present process with Runs A to D inclusive that, when the TiCl₄ is reduced by metallic aluminum under conditions different from the critical conditions which are observed in the practice of this invention, the compositions resulting from the reduction have different characteristics and/or exhibit different activities in polymerization than the crystalline violet compositions obtained when the critical conditions of the present process are observed. As is known in the literature, the reduction product obtained by the prior art methods appears to comprise AlCl₃ formed in situ during the reduction, and has a stability such that, for example, it shows a negligible or very limited loss in weight when heated at 250° C. under a residual pressure of 0.5 mm. Hg, and is a product which contains only a small portion of material which is extractable with a 10% aluminum triethyl solution. In contrast, a high proportion of AlCl₃ can be extracted from the reduction compositions of the present process, by the above treatments.

The violet crystalline compositions comprising violet crystalline TiCl₃ exclusively in the delta-form can be mixed with alkyl aluminum halides or other organometallic compounds of metals of Groups II or III to obtain highly active catalytic systems.

Some modifications may be made in practicing this invention without departing from the spirit thereof. It is intended, therefore, to include in the appended claims all such variations in details as will be apparent to those skilled in the art from the description and working examples given.

What is claimed is:

1. An improed process for the preparation of a crystalline, violet TiCl₃ composition in the delta form by reduction of titanium tetrachloride with aluminum metal in the stoichiometric ratio of 3 moles of TiCl per gram-atom of aluminum metal, in the absence of any diluent, wherein the reduction process is carried out in a rotating ball mill, using balls having a selected diameter in the range of from 14 to 27 mm., the operating conditions of the ball mill being selected so that the value of the ratio $$(K_s + K_t) \cdot \frac{K_s}{K_t} \cdot \frac{D}{d} \cdot n^2$$

wherein $K_s$ is the ratio between the weight of the balls in kg. and the volume of the ball mill in liters; $K_t$ is the ratio between the weight of TiCl₄ in kg. and the volume of the mill in liters; $D$ is the diameter of the ball mill in centimeters; $d$ is the diameter of the balls in centimeters; and $n$ is the speed of rotation of the mill in r.p.m.; is between $2.5 \times 10^6$ and $8.5 \times 10^6$, and at a temperature of from 100° C. to 250° C., until at least 85% of said titanium tetrachloride is converted to TiCl$_3$, said process being completed by continuing said rotation at a temperature lower than 100° C. so as to produce said delta form TiCl$_3$.

2. The process of claim 1, wherein the reduction is carried out in the presence of AlCl$_3$ catalyst.

3. The process of claim 1, wherein the reduction is carried out in the presence of HCl catalyst.

4. The process of claim 1, wherein the reduction is carried out in the presence of an alkyl halide catalyst.

5. The process of claim 1, wherein the conversion is completed at room temperature.

References Cited

UNITED STATES PATENTS

| | | | |
|---|---|---|---|
| 3,280,093 | 10/1966 | Coover et al. | 260—93.7 |
| 3,365,434 | 1/1968 | Coover et al. | 260—93.7 |
| 3,130,003 | 4/1964 | Tornquist et al. | 23—87 |
| 3,032,510 | 5/1962 | Tornquist et al. | 260—94.9 |
| 3,032,390 | 5/1962 | Caunt | 260—94.9 |
| 3,010,787 | 11/1961 | Tornquist | 260—94.9 |

OTHER REFERENCES

Natta et al.: J. Poly. Sci., 51, 387–398 (1961).
Natta et al.: J. Poly. Sci., 51, 399–410 (1961).

JOSEPH L. SCHOFER, *Primary Examiner.*

M. KURTZMAN, *Assistant Examiner.*

U.S. Cl. X.R.

252—429; 260—93.7, 94.9, 878

PO-1050
(5/69)

UNITED STATES PATENT OFFICE
CERTIFICATE OF CORRECTION

Patent No. 3,451,768    Dated June 24, 1969

Inventor(s) LUCIANI LUCIANO, and GIANFRANCO CORSI

It is certified that error appears in the above-identified patent and that said Letters Patent are hereby corrected as shown below:

Column 1, line 32, "250°C." should read -- 250°C., --. Column 3, line 47, "91" should read -- 9 1 --. Column 4, line 48, "reatcted" should read -- reacted --. Column 5, line 2, "AiCl$_3$" should read -- AlCl$_3$ --; lines 73 and 74, "polypylene" should read -- propylene --. Column 6, line 57, "improed" should read -- improved -- ; line 60, "TiCl" should read -- TiCl$_4$ --.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents